3,252,946
COMPOSITIONS CONTAINING HETEROCYCLIC COMPOUNDS AND RESINOUS PRODUCTS PREPARED THEREFROM
Roy T. Holm, Orinda, Calif., assignor to Shell Oil Company, New York, N.Y., a corporation of Delaware
No Drawing. Filed Oct. 15, 1962, Ser. No. 230,751
14 Claims. (Cl. 260—78.3)

This invention relates to new compositions of matter containing certain heterocyclic compounds and to resinous products prepared therefrom. More particularly, the invention provides new compositions containing compounds having a heterocyclic ring and an epoxy ring, and to resinous products obtained by heating the new compositions.

Specifically, the invention provides new and particularly useful compositions comprising a mixture of (1) a compound containing at least one ethylenic group which is adjacent to a hetero atom both of which are contained in a cyclic structure, and at least one oxirane, thiirane or aziridine group which is preferably in a terminal position, such as, for example, glycidyl dihydropyran-2-carboxylate, and (2) a compound possessing an amino nitrogen atom attached to hydrogen and preferably to an aromatic ring. The invention further provides valuable resinous products obtained by heating the above-described compositions.

As a special embodiment, the invention provides compositions particularly adapted for use in forming cured products having excellent resistance to distortion by heat comprising a mixture of (1) the above-described compound containing the heterocyclic ring and the epoxy ring, and (2) a polyamine such as, for example metaphenylene diamine. These special compositions are particularly suited for use in making high temperature laminates, adhesives, moldings, and surface compositions.

It is an object of the invention to provide a new class of compositions containing certain heterocyclic compounds and resinous products prepared therefrom. It is a further object to provide new compositions containing certain heterocyclic compounds which can be converted by heating to form useful and valuable resinous products. It is a further object to provide new compositions containing heterocyclic compounds which can be cured to form insoluble infusible products having excellent heat resistance. It is a further object to provide new compositions which are particularly suited for use in making high temperature laminates. It is a further object to provide new compositions containing heterocyclic compounds which are useful for preparation of high temperature adhesives, moldings and coating compositions. These and other objects of the invention will be apparent from the following detailed description thereof.

It has now been discovered that these and other objects may be accomplished by the new compositions of the invention comprising mixtures of (1) a compound comprising a cyclic structure containing an ethylenic group adjacent to a hetero atom, and at least one oxirane, thiirane or aziridine group, and (2) a compound containing an amino nitrogen attached to hydrogen and preferably to an aromatic ring such as, for example, metaphenylene diamine.

It has been unexpectedly found that when these special compositions are heated one obtains many useful and valuable resinous and polymeric type products. The products obtained by the use of the monoamine compounds, for example, are thermoplastic liquid to solid polymeric products which are useful as impregnating agents, additives for lubricating oils, high temperature lubricants, plasticizers, and the like. Those obtained by the use of the polyamines are cross-linked insoluble infusible products having many outstanding properties, and particularly outstanding resistance to distortion by heat. Cured products obtained in this manner, for example, have heat distortion points of the order of above 267° C. (end of measuring scale). Such products are suited for use in making high temperature laminates, moldings, adhesives, surface coatings and the like.

The material used in preparing the new compositions of the present invention comprise those compounds containing at least one cyclic group containing an ethylenic group adjacent to a hetero atom and at least one oxirane, thiirane or aziridine group which is preferably in a terminal position. By hetero atom is meant a polyvalent atom other than carbon, such as, for example, oxygen, nitrogen, sulfur, phosphorous, arsenic, antimony, tin, lead, silicon, and the like. Cyclic groups which contain both the hetero atom and the ethylenic group include, among others, the tetrahydropyridine, dihydropyran, thiophene, pyrrole, furan, and the like rings and their substituted derivatives, such as, for example, their alkylated and alkoxy-substituted derivatives. "Oxirane" group is a

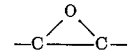

wherein an oxygen atom is connected to each of two adjacent carbon atoms, "thiirane" group is a

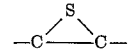

wherein a sulfur atom is connected to each of two adjacent carbon atoms, and "aziridine" group is a

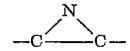

wherein a nitrogen atom is connected to each of two adjacent carbon atoms. The oxirane, thiirane and aziridine groups may be attached to the group containing the ethylenic linkage and hetero atom by any suitable means, such as by carbon, by an ether linkage or linkages, ester linkage or linkages, amide linkage or linkages, imide linkage or linkages, urethane linkage or linkages, and the like and mixtures thereof.

A preferred group of the above-described compounds include those of the formula

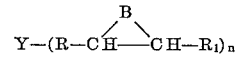

wherein Y is a heterocyclic ring containing an ethylenic group adjacent to an oxygen, nitrogen, sulfur, phosphorous, arsenic, antimony, tin, lead or silicon atom, R and R₁ are a hydrocarbon radical or hydrocarbon radical containing one or more ether oxygen, —S—, —SS—, ester, amide, imide, urethane, epoxy or the like linkages or mixtures thereof, and B is oxygen, nitrogen or sulfur, and $n$ is an integer of 1 to 3.

Particularly preferred group of the above-described compounds may be exemplified by the following structural formula

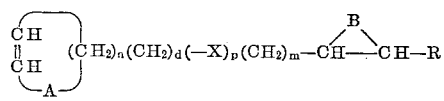

wherein A is oxygen, sulfur, nitrogen, phosphorous, arsenic, antimony, tin, lead, silicon and germanium, B is O, S or N, $n$ is an integer of at least 1, $p$ is 0 or 1, $d$ is 0 to 8, $m$ is 0 or an integer preferably from 1 to 10, X is a member of the group consisting of hydrocarbon radical, ether oxygen atom, ester linkage, e.g.,

ketone group

sulfide or sulfone linkage, nitrogen atom or amide linkage,

or polyurethane linkage

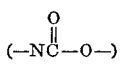

Especially preferred compounds of the above-described group include those of the formula

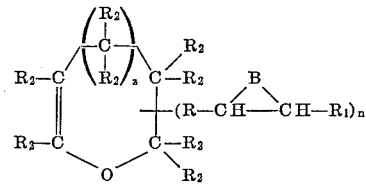

wherein at least one $R_2$ becomes the side chain radical

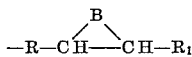

in which radical R and $R_1$ are a hydrocarbon radical or hydrocarbon radical containing one or more ether oxygen, —S—, —SS—, ester, amine, imide, urethane, epoxy or the like linkage or mixtures thereof, B is oxygen, nitrogen of sulfur, n is an integer of 1 to 3, and the remainimng $R_2$'s are hydrogen or a hydrocarbon radical, such as an alkyl radical of 1 to 6 carbon atoms, an alkoxy radical which preferably contains from 1 to 4 carbon atoms, or a halogen atom, and preferably chlorine, and z is 0 or 1.

Examples of the above-described compounds include, among others, glycidyl 3,4-dihydro-1,2-pyran-2-carboxylate;
2,3-epoxycyclohexyl 3,4-dihydro-1,2-pyran-2-carboxylate;
2,3-epoxypropyl 2-methyl-3,4-dihydro-1,2-pyran-2-carboxylate;
2,3-epoxybutyl 3,4-dihydro-1,2-pyran-2-carboxylate;
glycidyl 2,3-dihydro-thiophene-2-carboxylate;
glycidyl-2-methyl-2,3-dihydro-thiophene-2-carboxylate;
glycidyl N-methyl 1,2,3,4-tetrahydropyridine-2-carboxylate;
glycidyl N-methyl 2,3-dihydropyrrole-2-carboxylate;
2,3-epoxycyclohexyl 2-furoate;
glycidyl 2-furoate;
glycidyl pyrrole 2-carboxylate;
glycidyl 2,3-dihydrofuran-2-carboxylate;
2,3-epithiopropyl 2,3-dihydro-thiophene-2-carboxylate;
2,3-epithiopropyl 3,4-dihydro-1,2-pyran-2-carboxylate;
2,3-iminopropyl 3,4-dihydro-1,2-pyran-2-carboxylate;
3,4-epoxy-butyl 3,4-dihydro-1,2-pyran-2-carboxylate;
2,3-epoxyhexyl 3,4-dihydro-1,2-pyran-2-carboxylate;
5,6-epoxyoctyl 3,4-dihydro-1,2-pyran-2-carboxylate;
2-ethyl-2,3-epoxyhexyl 3,4-dihydro-1,2-pyran-2-carboxylate;
3,4-epoxydodecyl 3,4-dihydro-1,2-pyran-2-carboxylate;
7,8-epoxyoctadecyl 3,4-dihydro-1,2-pyran-2-carboxylate;
4,5-epoxyamyl 3,4-dihydro-1,2-pyran-2-carboxylate;
3-methyl-3,4-epoxybutyl 3,4-dihydro-1,2-pyran-2-carboxylate and
7,8-epoxyoctyl 3,4-dihydro-1,2-pyran-2-carboxylate.

Another group of the above described compounds include the esters of (a) alcohols containing the ethylenic group and hetero atom (b) oxirane, thiirane and aziridine substituted carboxylic acids. Examples of these esters include, among others, 3,4-dihydro-1,2-pyran-2-methyl 2,3-epoxypropionate;
3,4-dihydro-1,2-pyran-2-methyl 3,4-epoxybutyrate;
2,5-dimethyl-3,4-dihydro-1,2-pyran-2-methyl 2,3-epoxypropionate;
2-propyl-5-tertiary butyl 3,4-dihydro-1,2-pyran-2-methyl 2,3-epoxycyclohexane carboxylate;
2,3-dihydro-thiophene-2-methyl 2,3-epoxypropionate;
N-methyl 1,2,3,4-tetrahydropyridine-2-butyl 2,3-epoxycyclohexane carboxylate;
3,4-dihydro-1,2-pyran-2-methyl 2,3-epithiopropionate;
dihydrofuran-2-methyl 2,3-epithiobutanoate;
dihydrofuran-2-butyl 2,3-iminopropionate; and
2,3-dihydrothiophene-2-butyl 2,3-epithiocyclohexane carboxylate.

Another group of the above-described compounds include the ethers (1) containing the ethylenic group and hetero atom alcohols containing an oxirane, thiirane or aziridine ring. Examples of these include, among others, 3,4-dihydro-1,2-pyran-2-methyl epoxypropyl ether;
3,4-dihydro-1,2-pyran-2-methyl 2,3-epoxycyclohexyl ether;
2-ethyl-3,4-dihydro-1,2-pyran-2-butyl 3,4-epoxybutyl ether;
2,5-dimethyl-3,4-dihydro-1,2-pyran-2-methyl epoxycyclohexyl methyl ether;
3,4-dihydro-1,2-thiophene-2-methyl 2,3-epithiopropyl ether;
3,4-dihydro-1,2-pyran-2-methyl 2,3-epithiopropyl ether;
dihydrofuran-2-methyl 2,3-epithiopropyl ether; and the like, Another group of the materials that may be used in the compositions of the invention include the amides such as the amides of (1) carboxylic acids containing the ethylenic group and hetero atom and (2) amides containing an oxirane, thiirane or aziridine ring. Examples of these include, among others, N-epoxypropyl-2-methyl 3,4-dihydro-1,2-pyran-2-carboxylic acid amide;
N-epoxybutyl-3,4-dihydro-1,2-pyran-2-carboxylic acid amide;
N-epithiopropyl 3,4-dihydro-1,2-pyran-2-carboxylic acid amide.

Other examples include compounds of the formulae:

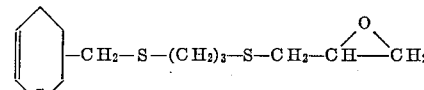

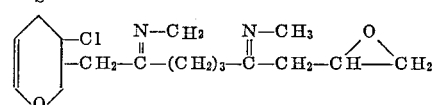

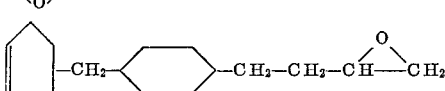

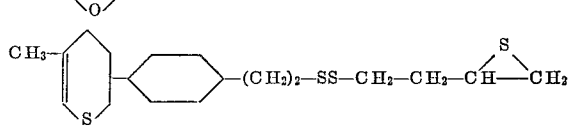

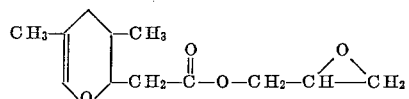

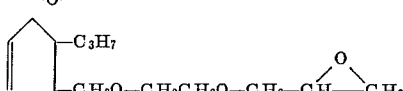

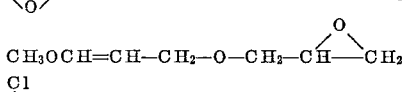

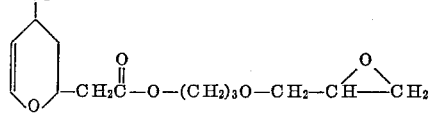

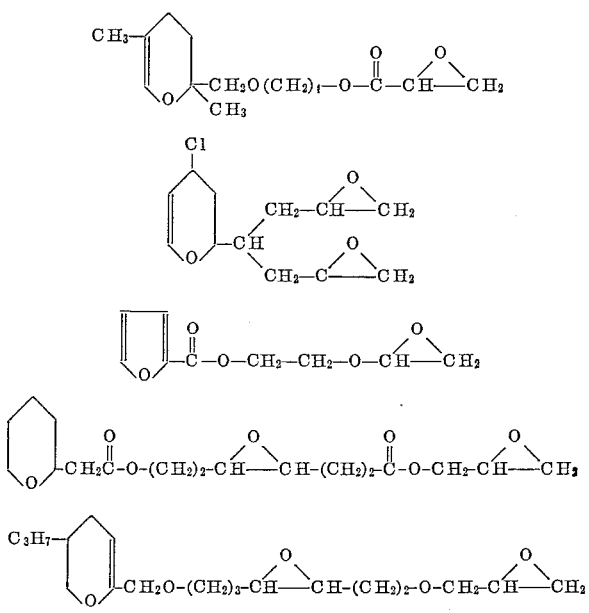

and their corresponding derivatives wherein the oxirane ring or rings are replaced with thiirane rings and aziridine rings.

The above-described compounds can be prepared by a variety of different methods. The esters of the heterocyclic acids and epoxy alcohols can, for example, be prepared by reacting a salt of the acid with an epoxy-substituted halide, preferably in the presence of a salt of a strong base and strong acid such as quaternary ammonium halide. A detailed description of making some of the above-noted esters may be found in copending patent application Serial No. 177,967, filed March 7, 1962, and now Patent Number 3,116,301. The ethers can be obtained by reacting the heterocyclic alcohol with an epoxy-substituted halide in the presence of an acid acting catalyst, such as boron trifluoride, and then dehydrochlorinating the resulting product with caustic. The epoxy-substituted amides may be prepared by reacting the amide with epichlorohydrin or related epoxy-substituted halides. Alternative methods involve using an ethylenically unsaturated halide in the above reactions in the place of the epoxy-substituted halide and then epoxidizing the resulting product under control conditions so as to convert the double bond to an epoxy group. The thiirane compounds may be obtained by first forming the corresponding epoxy compound and then reacting the epoxy compound with a thiocyanate such as ammonium thiocyanate or a metal thiocyanate as potassium thiocyanate. Detailed description of this method may be found in copending patent application 63,961, filed October 21, 1960, and now abandoned. The aziridine compounds may be made by preparing the corresponding epoxide and the reacting with ammonia to form the amino alcohol. This is then reacted with sulfuric acid to form the sulfate salt. The internal salt of the sulfate ester of the amino alcohol is then heated to form the aziridine ring.

The other component to be used in making the compositions of the present invention comprise the organic compounds possessing an amino nitrogen attached to hydrogen and preferably to an aromatic ring. These compounds may possess one or more amino nitrogen and one or more amino hydrogen. They may be substituted with other substituents, such as halogen atoms, alkoxy groups, ester groups, ether groups, alkenyl groups, and the like, and may be monomeric or polymeric.

Examples of the above-described compounds include, among others, the aromatic mono- and polyamines, such as aniline, N-ethyl aniline, p-chloroaniline, tert-butyl-aniline, p-hydroxyaniline, naphthylamine, diphenyl amine, ortho-, meta-, and para-phenylene diamine, diaminodiphenylmethane, p,p'-diaminodiphenylsulfone, triaminobenzene, diaminotoluene, diamino-diphenyl, 1,3-diamino - 4 - isopropylbenzene, 1,3-diamino-4,5-diethylbenzene, diaminostilbene and the like, and aliphatic and cycloaliphatic amines, such as, for example, ethylene diamine, diethylene triamine, triethylene tetramine, tetraethylene pentamine, 1,4-aminobutane, 1,3-diaminocyclohexane, 1-cyclohexylamino-3-aminopropane, 1,4-diaminocyclohexane, 1,3-diaminocycloheptane, di(aminocyclohexyl)methane, di(aminocyclohexyl)sulfone, 1,3-di(aminocyclohexyl)propane, 2,4-diaminocyclohexane, 4-isopropyl - 1,2 - diaminocyclohexane, 1,4-diaminomethylcyclohexane, di(hexamethylene)triamine, meta-xylylene diamine, N,N'-diethyl-1,3-propanediamine, hexapropylene heptamine, tetrabutylenepentamine, hexa-(1,1-dimethylethylene)-heptamine, pentaamylhexamine, tetra (1,3-dimethylpropylene)pentamine, N,N' - dibutyl - 1,6-hexanediamine, and the heterocyclic amines, such as the pyridines, piperidines, piperazines such as N-aminoethylpiperazine, melamines and the like.

Preferred amines include the polyamines, such as the aliphatic amines of the formula $$H_2N(RNH)_nH$$

wherein R is an alkylene radical, preferably of 2 to 4 carbon atoms, and $n$ is an integer of at least 1; polyamines having at least one amino or alkyl-substituted amino group attached directly to a cycloaliphatic ring containing from 5 to 7 carbon atoms; aminoalkyl-substituted aromatic compounds containing up to 20 carbon atoms; and N-(aminoalkyl)piperazines.

Other preferred amines include adducts of polyamines and monoepoxides, such as adducts of alkylene oxides and any of the above-described polyamines. Others include the soluble adducts of polyepoxides and monoamines, such as adducts of diglycidyl ether and dimethylamines. Still other examples include the adducts of polyamines and unsaturated nitriles, such as acrylonitrile.

Particularly preferred amines include those of the formulae

$$(NH_2)_mX—R—X(NH_2)_m$$
and $$X(NH_2)_n$$
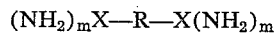

wherein X is a polyvalent aromatic hydrocarbon radical, preferably containing from 6 to 12 carbon atoms, R is a bivalent aliphatic hydrocarbon radical, preferably containing 1 to 6 carbon atoms, $n$ is an integer of at least 2, and preferably 2 to 4, and $m$ is an integer of at least 1, and preferably 1 to 3.

Mixtures of aromatic polyamines may also be used, and in some cases it may be desirable to use such mixtures. Thus, mixtures of normally solid diamines, or of a normally solid and a normally liquid diamine, may be prepared in such proportions that they are liquid at the normal working temperatures. Eutectic mixtures are advantageous on occasions. For example, a mixture of about 70 to 80% meta-phenylene diamine and 20 to 30% orthophenylene diamine has a melting point of only about 43° C. and is particularly useful for this reason. Other desirable eutectics include the mixture of meta-phenylene diamine and meta-aminophenol containing about 63% of the former which melts at about 24° C. and the mixture of meta-phenylene diamine and meta-dinitrobenzene, containing about 55% of the former and metals at 37° C. Mixtures of meta-phenylene diamine and p,p'-diaminodiphenylmethane (p,p'-methylene dianiline) in weight ratios between about 40:60 and 80:20 are especially desirable. A eutectic mixture of from 60 to 70% meta-phenylene diamine and 40 to 30% p,p'-diaminodiphenylmethane is a stable liquid for 5 to 6 days at 20 to 30° C. after preparation. More complex eutectic mixtures containing meta-phenylene diamine and two or more other substances may also be used.

Other examples include the polymeric amines, such as may be obtained by homopolymerizing and copolymerizing allylic amines, or by reaction of polyamines with polymers such as acrylic ester copolymers. Still other examples include adducts formed by reaction of polyamines with monoepoxides, such as described and claimed in U.S. 2,938,004, or by the reverse reaction of reacting mono-aromatic amines with polyepoxides. Still others include the adducts obtained by reaction of aromatic polyamines with unsaturated nitriles, such as acrylonitrile. Preferred species of these cyanoalkylated aromatic polyamines include those of the formula

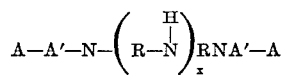

wherein $x$ represents an integer in the range of 0 through 3, A and A' represent hydrogen and cyanoethyl radicals and R represents the residue of the aromatic polyamine.

Still other examples include the imidazolines obtained by reacting monocarboxylic acids with aromatic polyamines, as well as the adducts obtained by reacting aromaticpolyamines with acrylates, such as methyl acrylate and ethyl acrylate.

The compositions of the invention may be prepared by any suitable method. If both of the two components are liquids, the compositions may be simply prepared by mixing the two together. If one or more of the components is a thick liquid or solid, it is generally preferred to combine the components in a suitable solvent or diluent. Various solvents or diluents which will evaporate before or during heating at cure are generally preferred.

In ratio of the heterocyclic compound and the amine employed on the composition will vary within certain limits depending upon the properties desired in the resulting products. Compositions having desired properties are obtained when the amine is employed in a chemical equivalent amount varying from about .8 to 1.5 per equivalent of heterocyclic compound. As used herein chemical equivalent amounts refers to that amount needed to furnish 1 amino hydrogen per ethylenic group adjacent to the hetero atom.

Other materials, such as fillers, dyes, plasticizers, stabilizers and the like may be added as desired along with suitable other resinous materials, such as vinyl resins, tars, pitches, distillate oils, alkyd resins and the like.

The resinification of the above-described compositions may be accomplished by merely heating the above-described composition. Temperatures employed will vary from about 90° C. to as high as or higher than 250° C.

Accelerators or catalysts can be added to accelerate the resinification. This includes acidic accelerators, such as amine hydrochlorides, stannous chloride, ferrous chloride, and the like. Such materials are employed in minor amounts, such as, for example, 0.01% to 5% by weight of the amine.

The compositions of the invention may be utilized for a variety of applications. The compositions are ideally suited for use in preparing coating compositions, impregnating and sealing compositions, foams, pottings, castings, adhesives, and the like.

When used for coating compositions, the new compositions of the invention may be used as such or mixed with various additives, such as plasticizers, stabilizers, and extenders such as oils, resins, tars, pitches, distillates, and the like, and then spread out as a film and baked at the desired temperature.

The products of the invention may also be used in preparing pottings and castings for electrical apparatus. In actual practice, the compositions are generally combined with the desired fillers, plasticizers, etc. and the mixture poured into the mold or casting containing the electrical apparatus, such as electrical motors and the like, and the mixture heated to the desired temperature.

The resinous products may also be employed to prepare valuable foamed products. In this application the resinous products of the invention are preferably combined with the desired foaming agents and others, such as thixotropic agents, pigments, stabilizing agents, and the like that may be desired. This mixture may be foamed and cured by applying heat.

The products of the invention may also be employed to prepare adhesives and impregnating compositions. In utilizing the products for these applications it is generally desirable to combine them with the desired diluent such as acrylonitrile, acetonitrile, crotononitrile, and desired fillers and stabilizers and then apply this mixture to the desired surface. Adhesive compositions prepared in this manner may be used to unite various surfaces such as wood-to-wood, metal-to-metal, resin-to-resin, and the like. The adhesives may be allowed to set at room temperature or heat may be applied to hasten the cure.

The compositions of the invention are also particularly useful and valuable in the preparation of laminates or resinous articles reinforced with fibrous textiles. Although it is generally preferred to utilize glass cloth for this purpose, any of the other suitable fibrous materials in sheet form may be employed such as glass matting, paper, asbestos paper, mica flakes, cotton bats, duck muslin, canvas and the like.

In preparing the laminate, the sheets of fibrous material are first impregnated with the composition of the invention. This may be accomplished by the use of compositions as such or by a solvent solution thereof. The impregnation of the sheets can be accomplished by any suitable method. The sheets may be impregnated, for example, by spreading or pouring the material onto the sheets and pressing the material down into the fibers by use of layers of cellophane or by the use of a doctor blade. The sheets may be impregnated also by dipping or otherwise immersing them in the impregnant. The solvent if any may be allowed to evaporate and the composition cured by the application of heat. The sheets may be cured singly or as an assembly of superimposed sheets. The curing is preferably accomplished at temperatures ranging from about 80° C. to 200° C. and a pressure of about 25 to 500 or more pounds per square inch. The resulting laminates are hard and tough and have excellent resistance to deformation at high temperatures.

To illustrate the manner in which the invention may be carried out the following examples are given. It is to be understood, however, that the examples are for the purpose of illustration and the invention is not to be regarded as limited to any of the specific conditions recited therein.

*Example I*

This example illustrates the preparation and use of the composition containing glycidyl 3,4-dihydro-1,2-pyran-2-carboxylate and metaphenylene diamine.

100 parts of glycidyl 3,4-dihydro-1,2-pyran-2-carboxylate was mixed with 37 parts of metaphenylene diamine and the mixture heated for 40 hours at 150° C. The resulting product was hard, insoluble infusible casting having a heat distortion point of above 267° C.

In a related experiment wherein phenyl glycidyl ether was heated with the same amount of metaphenylene diamine only a very thick viscous product was obtained.

*Example II*

This example demonstrates the superior compositions obtained from 2-epoxyethyl-3,4-dihydro-1,2-pyran.

100 parts of 2-epoxyethyl-3,4-dihydro-1,2-pyran was mixed with 54 parts of metaphenylene diamine. The mixture was heated for 24 hours at 150° C. The resulting product was a hard insoluble infusible casting having good resistance to heat.

*Example III*

This example illustrates the preparation and use of a composition containing 3,4-dihydro-1,2-pyran-2-methyl glycidyl ether and methylene dianiline.

100 parts of 3,4-dihydro-1,2-pyran-2-methyl glycidyl ether was combined with 58 parts of methylene dianiline and the mixture heated for 24 hours at 150° C. The resulting product was a hard insoluble infusible casting having a high distortion point.

*Example IV*

This example illustrates the preparation and use containing 2,3 - epithiopropyl-3,4-dihydro-1,2-pyran-2-carboxylate and metaphenylene diamine.

100 parts of 2,3-epithiopropyl 3,4-dihydro-1,2-pyran-2-carboxylate was combined with 34 parts of metaphenylene diamine and the mixture heated for 40 hours at 150° C. The resulting product was a hard insoluble infusible casting having a high heat distortion point.

*Example V*

100 parts of glycidyl 3,4-dihydro-1,2-pyran-2-carboxylate was combined with 26 parts of triethylene tetramine and the mixture heated at 150° C. for 24 hours. The resulting product was a hard acetone-insoluble casting having a Barcol hardness of 45.

*Example VI*

100 parts of glycidyl 3,4-dihydro-1,2-pyran-2-carboxylate was combined with 31 parts of 1,3-diaminocyclohexane and the mixture heated for 24 hours at 150° C. The resulting product was a hard acetone-insoluble casting having a Barcol hardness of 37.

*Example VII*

100 parts of glycidyl 3,4-dihydro-1,2-pyran-2-carboxylate was combined with 38 parts of 1,4-diaminomethylcyclohexane and the mixture heated at 150° C. The resulting product was a hard acetone-insoluble casting.

*Example VIII*

100 parts of glycidyl 3,4-dihydro-1,2-pyran-2-carboxylate was combined with 46 parts of di(hexamethylene) triamine and the mixture heated at 150° C. The resulting product was a hard acetone-insoluble casting.

*Example IX*

Examples V to VIII are repeated with the exception that the glycidyl ester is replaced with each of the following: 2-epoxyethyl-3,4-dihydro-1,2-pyran, 3,4-dihydro-1,2-pyran-2-methyl glycidyl ether and 3,4-dihydro-1,2-pyran-2-methyl 2,3-epithiopropyl ether. Related results are obtained in each case.

*Example X*

100 parts of glycidyl 3,4-dihydro-1,2-pyran-2-carboxylate is combined with 50 parts of meta-xylylene diamine and the mixture heated at 150° C. The resulting product is a hard insoluble casting.

*Example XI*

Examples I to III are repeated with the exception that the glycidyl ester is replaced with glycidyl dihydrofuran-2-carboxylate. Related results are obtained.

*Example XII*

Example I is repeated with the exception that the glycidyl ester is replaced with an equivalent amount of each of the following:

2,3-epoxycyclohexyl 3,4-dihydro-1,2-pyran-2-carboxylate;
glycidyl 2,3-dihydro-thiophene-2-carboxylate;
glycidyl N-methyl 2,3-dihydropyrrole-2-carboxylate;
2,3-epithiopropyl 3,4-dihydro-1,2-pyran-2-carboxylate
3-methyl-3,4-epoxybutyl 3,4-dihydro-1,2-pyran-2-carboxylate;
glycidyl N-methyl 1,2,3,4-tetrahydropyridine-2-carboxylate;
3,4-dihydro-1,2-pyran-2-methyl 2,3-epoxypropionate;
3,4-dihydro-1,2-pyran-2-methyl 2,3-epithiopropionate;
2,3-iminopropyl 3,4-dihydro-1,2-pyran-2-carboxylate and
2,3-iminocyclohexyl N-methyl 2,3-dihydropyrrole-2-carboxylate.

Related results are obtained.

I claim as my invention:

1. A heat curable composition consisting essentially of a mixture of (1) a compound of the formula

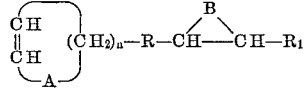

wherein A is a member of the group consisting of oxygen, sulfur and nitrogen, B is a member of the group consisting of oxygen, sulfur and nitrogen, $n$ is an integer of 1 to 3, R is a member of the group consisting of hydrocarbon radicals and hydrocarbon radicals containing an ether oxygen, a $$-\overset{O}{\underset{\|}{C}}-O-,\ -\overset{O}{\underset{\|}{C}}-,\ -S-,\ -SS-,\ -SO-,\ -SO_2-,\ -\overset{H}{\underset{|}{N}}-$$

or a $$-\overset{|}{\underset{|}{R}}-R_1$$

group wherein $R_1$ is a hydrocarbon radical, and (2) a polyamine of the group consisting of aromatic, aliphatic and cycloaliphatic polyamines.

2. A composition as in claim 1 wherein the polyamine is one having a formula $$X(NH_2)_n$$

or $$(NH_2)_m XRX(NH_2)_m$$

wherein X is a polyvalent aromatic hydrocarbon radical, $n$ is an integer of 2 to 4 and $m$ is an integer of 1 to 3.

3. A heat curable composition consisting essentially of a mixture of (1) a compound of the formula

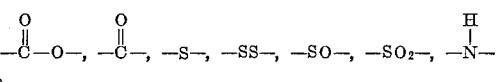

wherein A is a member of the group consisting of oxygen, sulfur, and nitrogen, B is a member of the group consisting of oxygen, sulfur and nitrogen, $n$ is an integer of 1 to 3, $m$ is 0 to 10, $p$ is 0 or 1, X is a member of the group consisting of hydrocarbon radicals, ether oxygen atom, $$-\overset{O}{\underset{\|}{C}}-O-,\ -\overset{O}{\underset{\|}{C}}-,\ -S-,\ -SS-,\ -SO-,\ -SO_2-,\ -\overset{H}{\underset{|}{N}}-,\ -\overset{|}{\underset{|}{N}}-R_1$$

(wherein $R_1$ is hydrocarbon radical) linkages, and R is a member of hydrogen and hydrocarbon radicals, and (2) an aromatic polyamine.

4. A heat curable composition consisting essentially of (1) a compound of the formula

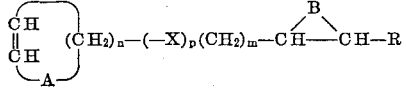

wherein one $R_2$ becomes the side change

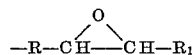

wherein R is a member of the group consisting of hydrocarbon radicals and hydrocarbon radicals substituted with an ether oxygen atom, $$-\overset{O}{\underset{\|}{C}}-O-,\ -\overset{O}{\underset{\|}{C}}-,\ -S-,\ -SS-,\ -SO-,\ -SO_2-,\ -\overset{H}{\underset{|}{N}}-$$

or

wherein $R_3$ is a hydrocarbon radical, $R_1$ is hydrogen and a hydrocarbon radical, and the remaining $R_2$'s are hydrogen or a hydrocarbon radical, and (2) an aromatic polyamine.

5. A heat curable composition consisting essentially of (1) epoxy alkyl ester of dihydropyran carboxylic acid, and (2) metaphenylene diamine.

6. A heat curable composition consisting essentially of a mixture of glycidyl 3,4-dihydro-1,2-pyran-2-carboxylate and metaphenylene diamine.

7. A heat curable composition consisting essentially of glycidyl 3,4-dihydro-1,2-pyran-methyl ether and p,p'-methylene dianiline.

8. A heat curable composition consisting essentially of 2-epoxyethyl-3,4-dihydro-1,2-pyran and metaphenylene diamine.

9. A hard insoluble infusible product obtained by heating the composition defined in claim 1.

10. A hard insoluble infusible product obtained by heating the composition defined in claim 3.

11. A hard insoluble infusible product obtained by heating the composition defined in claim 5.

12. A hard insoluble infusible product obtained by heating the composition defined in claim 8.

13. A heat curable composition consisting essentially of (1) a compound of the formula

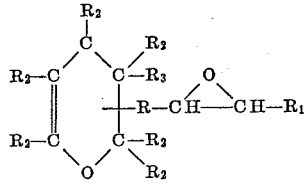

wherein one $R_2$ becomes the side change

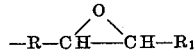

wherein R is a member of the group consisting of hydrocarbon radicals and hydrocarbon radicals substituted with an ether oxygen atom,

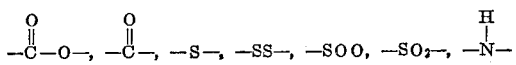

or

—NR₃ wherein $R_3$ is a hydrocarbon radical, $R_1$ is hydrogen and a hydrocarbon radical, and the remaining $R_2$'s are hydrogen or a hydrocarbon radical, and (2) an aliphatic polyamine.

14. A heat curable composition consisting essentially of (1) a compound of the formula

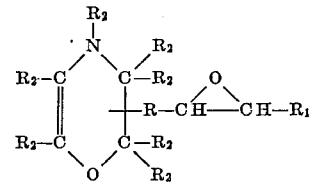

wherein one $R_2$ becomes the side change

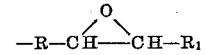

wherein R is a member of the group consisting of hydrocarbon radicals and hydrocarbon radicals substituted with an ether oxygen atom,

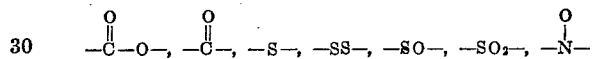

or

wherein $R_3$ is a hydrocarbon radical, $R_1$ is hydrogen and a hydrocarbon radical, and the remaining $R_2$'s are hydrogen or a hydrocarbon radical, and (2) a cycloaliphatic amine.

References Cited by the Examiner
UNITED STATES PATENTS 3,116,301 12/1963 Williams et al. _____ 260—2
3,128,255 4/1964 McGary et al. _____ 260—2

JOSEPH L. SCHOFER, *Primary Examiner.*
LEON J. BERCOVITZ, *Examiner.*